Figure 1:
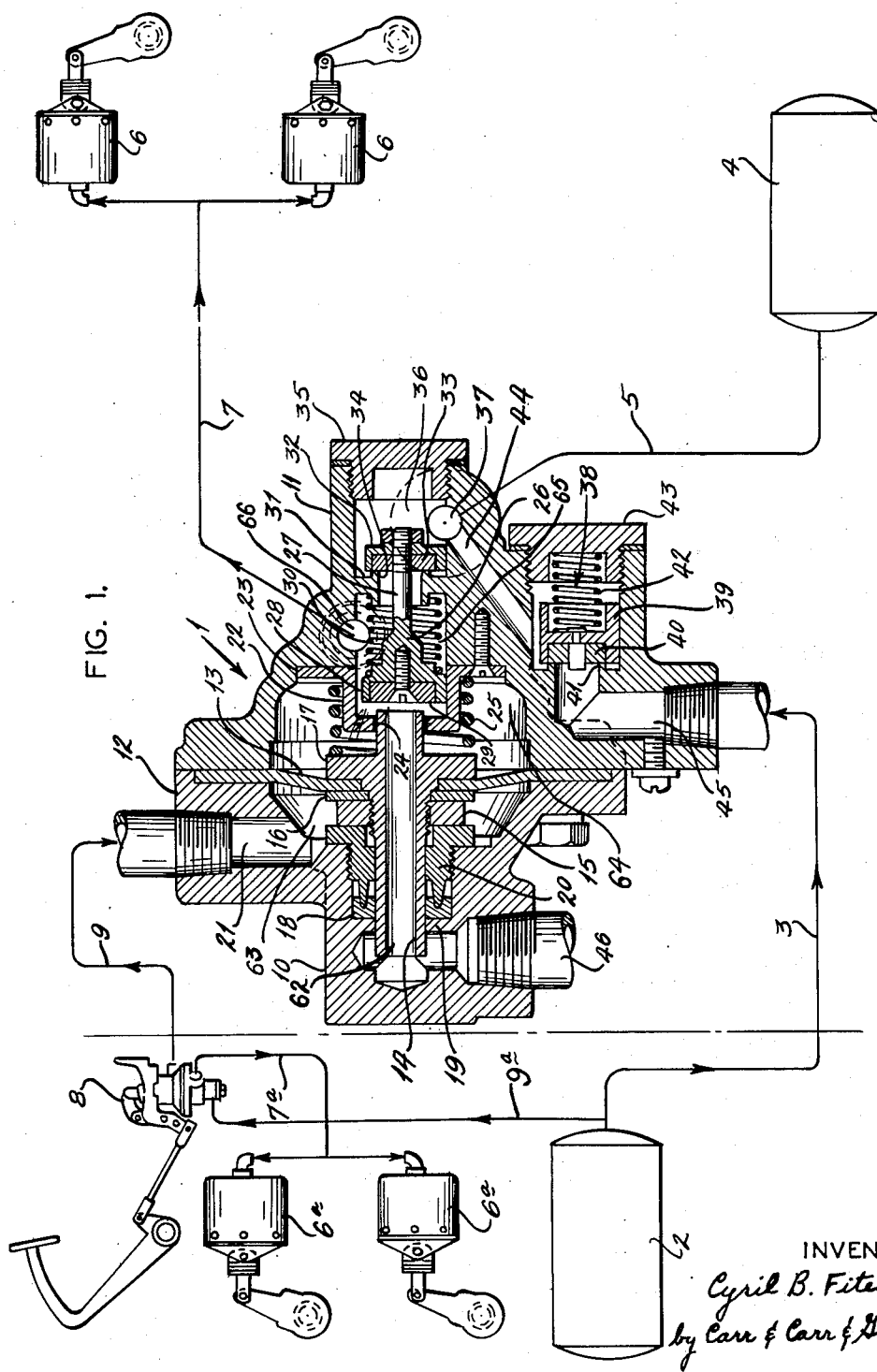

Oct. 20, 1953  C. B. FITES  2,656,014
RELAY VALVE FOR TRACTOR TRAILER BRAKE SYSTEMS
Filed Nov. 3, 1949  2 Sheets-Sheet 1

INVENTOR:
Cyril B. Fites,
by Carr & Carr & Gravely,
HIS ATTORNEYS.

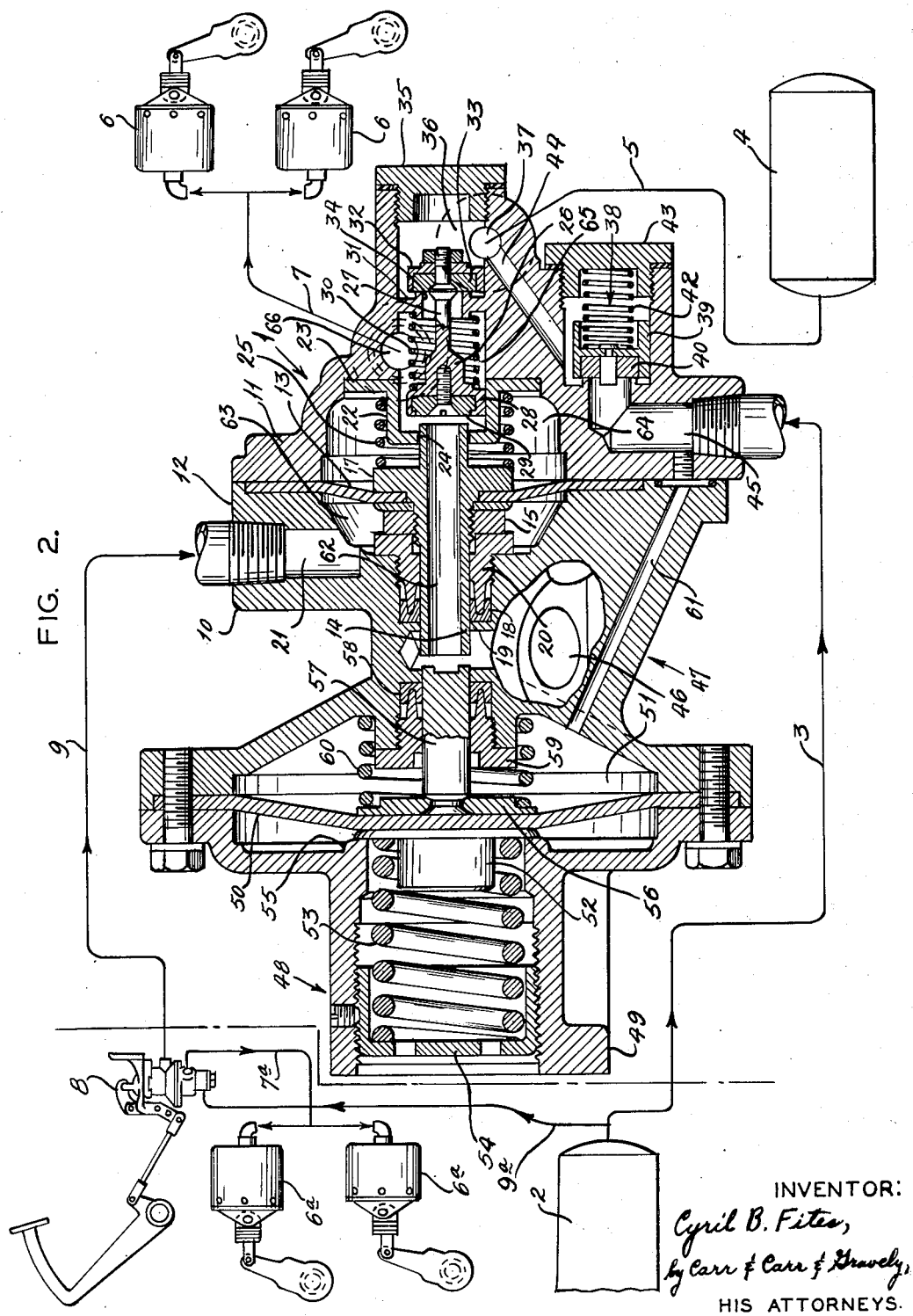

Patented Oct. 20, 1953

2,656,014

UNITED STATES PATENT OFFICE 2,656,014

RELAY VALVE FOR TRACTOR TRAILER BRAKE SYSTEMS

Cyril B. Fites, St. Johns, Mo., assignor to Wagner Electric Corporation, St. Louis, Mo., a corporation of Delaware Application November 3, 1949, Serial No. 125,331

4 Claims. (Cl. 188—3)

This invention relates to relay valves of the kind used in fluid pressure brake systems for automotive vehicles for applying fluid pressure to a fluid operated brake cylinder located at a distance from a main source of fluid pressure, such as in the case of brakes on a trailer of a tractor-trailer combination or on the rear brakes of a truck with a long wheel base, so as to cause the remotely located brakes to operate in response to an operator's action as quickly as the front wheel brakes of the vehicle.

This invention also relates to emergency relay valves of the kind used in fluid brake systems for automotive vehicles for automatically applying the remotely located brakes when the pressure in the main reservoir of the system falls below a predetermined value for any reason.

This invention relating to relay valves and emergency relay valves is used in combination with a fluid pressure braking system having a main reservoir, an auxiliary reservoir, brake operating cylinders, a brake application valve, and comprises a housing having a diaphragm or diaphragms therein.

The object of this invention is to provide in a braking system, a relay valve having fewer parts, a more simple construction, and a more practical embodiment in that it provides a more rapid and positive action than those valves heretofore used.

Another object of this invention is to meter the amount of pressure fluid applied to the remotely located brakes to the exact amount desired by the operator so that an operator can "feel" the application of said remotely located brakes and control said application in proportion to the application of his manual control means.

Another object of this invention is to provide in a braking system, an emergency valve having a simple construction of few parts which imparts a positive emergency action to an improved relay valve.

The invention also consists in the parts and arrangements and in the combination of parts hereinafter described and claimed.

In the accompanying drawings, which form part of this specification and wherein like numerals refer to like parts wherever they occur:

Fig. 1 is a diagrammatic view of a fluid pressure brake system showing a longitudinal cross-sectional view of the relay valve therein, and Fig. 2 is a diagrammatic view of a fluid pressure brake system showing a longitudinal cross-sectional view of the emergency relay valve therein.

In Fig. 1 of the accompanying drawing, my relay valve 1 is shown embodied in a system having a main reservoir 2 supplied with fluid under pressure from a source not shown and connected with said relay valve 1 by a main reservoir line 3, an auxiliary reservoir 4 adapted for receiving pressure fluid from said main reservoir 2 and connected with the relay valve 1 by an auxiliary reservoir line 5, said relay valve 1 and auxiliary reservoir 4 being located near brake operating cylinders 6 which receive pressure fluid from said auxiliary reservoir 4 through a brake operating cylinder line 7, and a brake application valve 8 connected with said main reservoir 2 by a line 9a, said relay valve 1 connected to said brake application valve 8 by a brake application valve line 9. Front brake operating cylinders 6a are connected to the brake application valve 8 by means of a brake operating cylinder line 7a. The brake operating cylinders 6 are remotely located and may be on the trailer of a tractor-trailer combination or on the rear brakes of a truck having a long wheel base. The front brake operating cylinders 6a may be located on the front and/or rear brakes of a tractor in a tractor-trailer combination or on the front brakes of a truck having a long wheel base.

The relay valve 1 comprises a left housing member 10 and a right housing member 11 rigidly secured together to form housing 12 for the relay valve 1. Secured in said housing 12 by its outer edge portion is a diaphragm 13 having a central opening therein for receiving an exhaust valve stem 14 rigidly mounted thereto by means of a lock nut 15 and a washer 16 cooperating with an exhaust valve stem flange 17 on said exhaust valve stem 14. Fitting circumferentially over the exhaust valve stem 14 is a packing cup 18 positioned between a shoulder 19 in the left housing member 10 and a packing cup retainer 20 which fits circumferentially over said exhaust valve stem 14 and in abutting relation to said lock nut 15. The exhaust valve stem 14 is provided with an exhaust valve stem passage 62 to connect a chamber 64 (to be described later) with an exhaust port 46; thus a means of exhausting pressure fluid from the brake operating cylinders 6 is provided. A cavity is provided in the left housing member 10 which in conjunction with a diaphragm 13 forms an application chamber 63. The application chamber 63 is connected to the brake application valve 8 by the brake application valve line 9 and an inlet passage 21.

The diaphragm 13 also forms a wall for another chamber 64, mentioned above, partially formed by a cavity in the left end of the right housing member 11. A cupped guide member 22 having a cupped guide member flange 23 thereon is rigidly secured to the wall of the chamber 64 in axial relation to said exhaust valve stem 14 and surrounds said exhaust valve stem 14 allowing a passageway 24 therebetween. A diaphragm return spring 25 is positioned over said cupped guide member 22 so as to rest upon the cupped guide member flange 23 and abut against the exhaust valve stem flange 17. Located immediately to the right of the chamber 64 is a valve chamber 65 having an outlet port 66 for connection with the brake operating cylinder line 7. An exhaust-actuating valve 26 is located within said valve chamber. The exhaust-actuating valve 26 comprises an exhaust-actuating valve stem 27 having an exhaust valve head 28 thereon with an exhaust valve head insert 29 therein, said exhaust valve head insert 29 being in axial alignment with the exhaust valve stem 14 to control the opening of the exhaust valve stem passage 62 therein, and an actuating valve spring 30 positioned over said exhaust-actuating valve stem 27 between the exhaust valve head 28 and a rib section 31 which is a part of the right housing member 11. The exhaust-actuating valve stem 27 is extended to the right of the said rib section 31 into an actuating chamber 36 formed by a closure cap 35 and the right housing member 11. Secured to the right end of the said exhaust-actuating valve stem 27 is an actuating valve head 32 with an actuating valve head insert 33 therein in abutting relation to an actuating valve seat 34 located on said rib section 31 for controlling the opening formed by the said rib section 31 between the valve chamber 65 and the actuating chamber 36. An auxiliary reservoir port 37 is provided in the actuating chamber 36 as a means of connecting the said actuating chamber 36 with the auxiliary reservoir line 5.

In the lower portion of the right housing member 11 is a check valve 38 for allowing the flow of pressure fluid in only one direction and comprising a slidable check valve head 39 with a check valve insert 40 in abutting relation to a check valve seat 41 in said right housing member 11, and a check valve spring 42 positioned between said check valve head 39 and a check valve spring cap 43 which forms a closure means for the right housing member 11. A duct 44 leads from said check valve 38 to the actuating chamber 36. An inlet chamber 45 is located on the opposite side of the check valve 38 from the duct 44.

In operation, the main reservoir 2 is under fluid pressure from a source (not shown). When the pressure in said main reservoir 2 exceeds a predetermined amount, the check valve 38 allows fluid to pass therethrough into the duct 44 to the actuating chamber 36 and out through the auxiliary reservoir port 37 and the auxiliary reservoir line 5 into the auxiliary reservoir 4.

When the brake application valve 8 is actuated pressure fluid passes through the brake application valve line 9 into the passage 21 and then into the application chamber 63 to force the diaphragm 13 rightwardly. Since the volume of the application chamber 63 is small, pressure can be built up on the left side of the diaphragm 13 very quickly. This pressure forces the diaphragm 13 rightwardly compressing the diaphragm return spring 25 and causing the exhaust valve stem 14 to move rightwardly until it engages the exhaust valve head insert 29 creating an air seal therebetween thus closing the exhaust valve stem passage 62 in said valve stem 14 leading to exhaust port 46. Continued rightward movement of said diaphragm 13 and said exhaust valve stem 14 forces the exhaust-actuating valve 26 rightwardly compressing the actuating valve spring 30 and causing the actuating valve head insert 33 to unseat from the actuating valve seat 34, thereby allowing pressure fluid from the auxiliary reservoir 4 to come through the auxiliary reservoir line 5, the auxiliary reservoir port 37, the actuating chamber 36, the valve chamber 65, the outlet port 66 and out through the brake operating cylinder line 7 into the brake operating cylinders 6.

While pressure fluid is flowing through the valve chamber 65 to the brake operating cylinders 6 a portion of the said pressure fluid also flows through the clearance or passageway 24 between the exhaust valve stem 14 and the cupped guide member 22 into the chamber 64. The passageway 24 is slightly restricted so as to prevent a pressure build-up in the chamber 64 ahead of that pressure which results from the flow of pressure fluid to the brake operating cylinders 6, whereby such a condition if not prevented, would cause a fluttering action of the movable parts in the relay valve 1. The movement of the exhaust valve within the passageway 24 and the pressure passing therethrough in both directions will aid in keeping the passageway clean of dirt and other extraneous material. As the pressure fluid enters the chamber 64 a pressure is created therein which in turn creates a force on the diaphragm 13. The pressure in the chamber 64 will therefore increase until the resultant force due to the presence of the pressure fluid and the forces of the diaphragm return spring 25 and the actuating valve spring 30 overcome the force acting on the left side of the diaphragm 13 in the application chamber 63. As this condition occurs the diaphragm 13 and the attached exhaust valve stem 14 are moved to the left sufficiently to allow the exhaust-actuating valve 26 to assume a "lapped" position; that is, the actuating valve head insert 33 is placed upon the actuating valve seat 34 and the exhaust valve head insert 29 is still held against the end of the exhaust valve stem 14. Thus, the pressure in the chamber 64, which is equal to the pressure in the brake operating cylinders 6, will remain constant until a further braking application is made by the operator by increasing the fluid pressure in the application chamber 63 whereupon the diaphragm 13 is again moved to the right. The exhaust valve stem 14, carried by said diaphragm 13 and by virtue of its contact with the exhaust valve head insert 29, will again unseat the actuating valve head insert 33 from the actuating valve seat 34 permitting a flow of pressure fluid from the auxiliary reservoir 4 as previously described. Consequently, it becomes evident that a given pressure in the application chamber 63 will produce a proportional pressure in the chamber 64 and the brake operating cylinders 6. The operator "feel" is produced by the forces acting on the right side of the diaphragm 13 created primarily by the fluid pressure acting on the said diaphragm 13 in the chamber 64.

When the operator reduces the pressure in the application chamber 63 by exhausting pressure fluid at the brake application valve 8 the diaphragm 13 is moved leftwardly under the influence of the greater pressure acting within the chamber 64 and the diaphragm return spring 25. The actuating valve head insert 33 having seated prior to the pressure reduction now being described, further movement of the exhaust-actuating valve 26 to the left is prohibited. When there is a complete reduction of the pressure formerly developed in the application chamber 63, the diaphragm 13 and the exhaust valve stem 14 move sufficiently to the left to break contact between the end of the said exhaust valve stem 14 and the exhaust valve head insert 29 thereby opening the exhaust passage 62 in the said exhaust valve stem 14. The pressure fluid in the chamber 64, the valve chamber 65, the brake operating cylinder line 7 and the brake operating cylinders 6 is then exhausted through the exhaust passage 62 and exhaust port 46 to the atmosphere.

In Fig. 2 of the accompanying drawing, my emergency relay valve 47 is shown embodied in a system having a main reservoir 2 supplied with fluid under pressure from a source not shown and connected with said relay valve 1 by a main reservoir line 3, an auxiliary reservoir 4 adapted for receiving pressure fluid from said main reservoir 2 and connected with the relay valve 1 by an auxiliary reservoir line 5, said relay valve 1 and auxiliary reservoir 4 being located near brake operating cylinders 6 which receive pressure fluid from said auxiliary reservoir 4 through a brake operating cylinder line 7, and a brake application valve 8 supplied with pressure fluid from the main reservoir 2 through the line 9a and connected with said relay valve 1 by a brake application valve line 9. Front brake operating cylinders 6a are connected to the brake application valve 8 by means of a brake operating cylinder line 7a. The brake operating cylinders 6 are remotely located and may be on the trailer of a tractor-trailer combination or on the rear brakes of a truck having a long wheel base. The front brake operating cylinders 6a may be located on the front and/or rear brakes of a tractor in a tractor-trailer combination or on the front brakes of a truck having a long wheel base.

An emergency valve 48 is mounted on the relay valve hereinbefore described for forming the emergency relay valve 47. The emergency valve 48 comprises an emergency valve housing 49 rigidly secured to the modified left housing member 10 of the relay valve 1 for forming the emergency relay valve 47. Secured between the emergency valve housing 49 and the modified left housing member 10 is an emergency valve diaphragm 50 forming an emergency valve chamber 51 to the right of said emergency valve diaphragm 50. A follower 52 is in abutting relationship to the emergency valve diaphragm 50 and fits within an emergency valve spring 53 which is held within the emergency valve housing 49 by an emergency valve spring retainer 54. Said follower 52 and the emergency valve diaphragm 50 are restricted from excessive leftward movement by virtue of the contact between the flanged portion of the follower 52 and the shoulder 55 on the emergency valve housing 49 when in the position shown in the drawing.

On the right side and in abutting relationship to the emergency valve diaphragm 50 is a relay valve operating stem base 56 and a relay valve operating stem 57. Fitting circumferentially over said relay valve operating stem 57 is a packing seal 58 held in position by packing seal retainer 59. A relay valve operating stem return spring 60 fits over said relay valve operating stem 57 and abuts against the relay valve operating stem base 56.

An emergency valve passageway 61 connects the inlet chamber 45 in the relay valve 1 with the emergency valve chamber 51 in the emergency valve 48.

In operation, the relay valve 1 portion of the emergency relay valve 47 operates as hereinbefore described. The pressure fluid in the main reservoir 2 is allowed to flow through the main reservoir line 3 to the inlet chamber 45, through the emergency valve passageway 61 into the emergency valve chamber 51 at all times where, if the resultant pressure is sufficient, it forces the emergency valve diaphragm 50 leftwardly compressing the emergency valve spring 53 until the flange on the follower 52 abuts against the shoulder 55 on the emergency valve housing 49. This action allows the relay valve operating stem 57 to move leftwardly under the influence of the relay valve operating stem return spring 60 and away from the exhaust valve stem 14.

Therefore, so long as the pressure in the main reservoir 2 and its associated pipe system remain above a predetermined value, the relay valve 1 portion of the emergency relay valve 47 operates exactly as hereinbefore described. But should there be, for any reason, a lowering of pressure below the minimum pressure required to sufficiently compress the emergency valve spring 53, the emergency valve diaphragm 50 will move rightwardly until the relay valve operating stem 57 contacts the exhaust valve stem 14.

A further decrease in pressure will allow further rightward movement of said emergency valve diaphragm 50 thereby causing the relay valve operating stem 57 to move the exhaust valve stem 14 rightwardly just as if the operator had actuated the brake application valve 8. The amount of movement of the emergency valve diaphragm 50 caused by any lowering of pressure is determined by the ratio of the area of the emergency valve diaphragm 50 to area of the diaphragm 13.

An adjustment whereby a drop of 2 pound pressure below a predetermined value will cause a pressure of twice this amount to be applied to the brake operating cylinders works very satisfactorily.

In the event of a complete breakaway of the trailer from the tractor the main reservoir line 3 is broken and the pressure in the emergency valve chamber 51 is immediately reduced to atmospheric pressure thus allowing the emergency valve spring 53 to force the relay valve operating stem 57 rightwardly completely, thus forcing the exhaust valve stem 14 rightwardly closing the exhaust valve stem passage 62 therein and causing the actuating valve head insert 33 to unseat from the actuating valve seat 34, thereby allowing pressure fluid from the auxiliary reservoir 4 to come through the auxiliary reservoir line 5, the auxiliary reservoir port 37, the actuating chamber 36, the valve chamber 65, the port 66 and out through the brake operating cylinder line 7 into the brake operating cylinders 6. Having previously closed the exhaust valve stem passage 62 leading to the exhaust port 46, the position of all parts remains unchanged until pressure is again built up in the emergency valve chamber 51.

What I claim is:

1. A relay valve comprising a casing, an exhaust port in the casing, a single diaphragm in the casing responsive for movement in one direction to fluid pressure from an application valve, a spring in the casing bearing against the non-pressure side of the diaphragm and resisting movement of the diaphragm in one direction, a normally open exhaust valve comprising a hollow member, the exhaust valve being operatively connected to and extending through the diaphragm, one end of the exhaust valve being slidably mounted in the casing and extending into the exhaust port, the spring circumscribing a portion of the exhaust valve, the casing having a guide passageway therein, a combined exhaust valve seat and a normally closed actuating valve in the passageway, the other end of the exhaust valve extending into the passageway and engageable with the exhaust valve seat to close the exhaust valve upon movement of the diaphragm upon the application of pressure to the diaphragm, upon application of additional pressure to the diaphragm the exhaust valve moves the seat and thereby opens the normally closed actuating valve allowing the actuating pressure to pass therethrough, the diameter of the passageway being larger than the diameter of the actuating valve, the exhaust valve seat and the end of the exhaust valve extending into the passageway thus forming a restricted by-pass around that portion of the exhaust valve extending into the passageway so that a portion of the actuating pressure passing around the actuating valve will by-pass around that portion of the exhaust valve within the passageway and the exhaust valve seat to the non-pressure side of the diaphragm to aid the spring in balancing excessive movement of the diaphragm and provide smooth application of the actuating pressure.

2. In combination with a fluid pressure brake system having a main reservoir, an auxiliary reservoir, means for allowing fluid pressure to flow from the main reservoir to the auxiliary reservoir, a brake application valve, and brake operating cylinders, a relay valve comprising a casing, an exhaust port in the casing, an application chamber within the casing in connection with the brake application valve, a single diaphragm in the chamber movable in one direction in response to fluid pressure from the application valve, a spring in the casing bearing against the non-pressure side of the diaphragm and resisting movement of the diaphragm in one direction, a normally open exhaust valve comprising a hollow member, the exhaust valve being operatively connected to and extending through the diaphragm, one end of the exhaust valve being slidably mounted in the casing and extending into the exhaust port, the spring circumscribing a portion of the exhaust valve, the casing having a guide passageway therein, a combined exhaust valve seat and a normally closed actuating valve in the passageway, the other end of the exhaust valve extending into the passageway and engageable with the exhaust valve seat to close the exhaust valve upon the movement of the diaphragm upon the application of pressure to the diaphragm, upon application of additional pressure to the diaphragm the exhaust valve moves the seat and thereby opens the normally closed actuating valve allowing actuating pressure to flow from the auxiliary reservoir to the brake operating cylinders, the diameter of the passageway being larger than the diameter of the actuating valve, the exhaust valve seat and the end of the exhaust valve within the passageway thus forming a restricted annular by-pass around that portion of the exhaust valve extending into the passageway so that a portion of the pressure passing around the actuating valve will by-pass around that portion of the exhaust valve within the passageway and the exhaust valve seat to the non-pressure side of the diaphragm to aid the spring in balancing excessive movement of the diaphragm and provide smooth application of the actuating pressure.

3. A relay valve as set forth in claim 1 wherein the guide passageway is a bore within the casing closed at one end by a hollow cup member having a radial base flange, a forwardly extending circumferential vertical wall and a front wall having a centrally disposed opening therein, the end of the exhaust valve within the passageway extending through the opening in the front wall, the diameter of the openings being larger than the diameter of that portion of the exhaust valve extending therethrough, and the spring having a portion thereof about the circumferential wall with an end bearing against the base flange and with the other end of the spring bearing against the exhaust valve.

4. The combination as set forth in claim 2 in which the guide passageway is a bore within the casing closed at one end by a hollow cup member having a radial base flange, a forwardly extending circumferential vertical wall and a front wall having a centrally disposed opening therein, the end of the exhaust valve within the passageway extending through the opening in the front wall, the diameter of the openings being larger than the diameter of that portion of the exhaust valve extending therethrough, and the spring having a portion thereof about the circumferential wall with an end bearing against the base flange and with the other end of the spring bearing against the exhaust valve.

CYRIL B. FITES.

References Cited in the file of this patent

UNITED STATES PATENTS

| Number | Name | Date |
| --- | --- | --- |
| 765,638 | Schramm | July 19, 1904 |
| 2,260,434 | Campbell | Sept. 28, 1941 |
| 2,289,559 | Turek | July 14, 1942 |
| 2,380,507 | Eaton | July 31, 1945 |
| 2,392,185 | Pickert | Jan. 1, 1946 |